United States Patent [19]

Kuh et al.

[11] Patent Number: 4,681,677
[45] Date of Patent: Jul. 21, 1987

[54] WATER PROCESSOR HAVING AUTOMATIC SHUTOFF AND BYPASS MEANS

[75] Inventors: Louis M. Kuh; Robert C. Lampe, both of Stamford, Conn.

[73] Assignee: Olin Corporation, Cheshire, Conn.

[21] Appl. No.: 762,816

[22] Filed: Aug. 5, 1985

Related U.S. Application Data

[63] Continuation of Ser. No. 326,963, Dec. 2, 1981, abandoned, which is a continuation of Ser. No. 167,169, Jul. 8, 1980, abandoned, which is a continuation-in-part of Ser. No. 39,936, May 17, 1979, abandoned, which is a continuation-in-part of Ser. No. 879,027, Feb. 17, 1978, abandoned.

[51] Int. Cl.⁴ .............................................. B01D 27/10
[52] U.S. Cl. ....................................... 210/88; 210/90; 210/91; 210/94; 210/100; 210/111; 210/130; 210/134; 210/259; 210/266; 210/282; 210/295
[58] Field of Search ......................... 210/87, 88, 90, 91, 210/94, 95, 100, 111, 114, 130, 134, 135, 143, 259, 266, 282, 295, 418

[56] References Cited

U.S. PATENT DOCUMENTS

| | | | |
|---|---|---|---|
| 1,933,369 | 10/1933 | Dotterweich | 210/98 |
| 2,617,766 | 11/1952 | Emmett et al. | |
| 3,509,998 | 5/1970 | Pellett et al. | 210/98 |
| 3,827,558 | 8/1974 | Firth | 210/90 |
| 3,856,676 | 12/1974 | Grimme, Jr. et al. | 210/96 |
| 3,974,070 | 8/1976 | Popov et al. | 210/667 |
| 4,001,120 | 1/1977 | Gelman et al. | 210/420 |
| 4,025,705 | 5/1977 | Corte et al. | 210/692 X |
| 4,048,071 | 9/1977 | Yamada et al. | 210/90 |
| 4,059,522 | 11/1977 | Polley et al. | 210/753 X |
| 4,176,057 | 11/1979 | Wheatley et al. | 210/259 |

Primary Examiner—David Sadowski
Attorney, Agent, or Firm—Ralph D'Alessandro; Thomas P. O'Day

[57] ABSTRACT

A water treatment or processor device for household use or commercial use (for example, in a restaurant) is provided with fail-safe features in accordance with this invention to shut the treatment device "off" when an element thereof has become ineffective, such as the saturation of an adsorption element or the clogging of a filter element. Once the device is turned "off", it cannot be restarted until the depleted element has been replaced.

16 Claims, 5 Drawing Figures

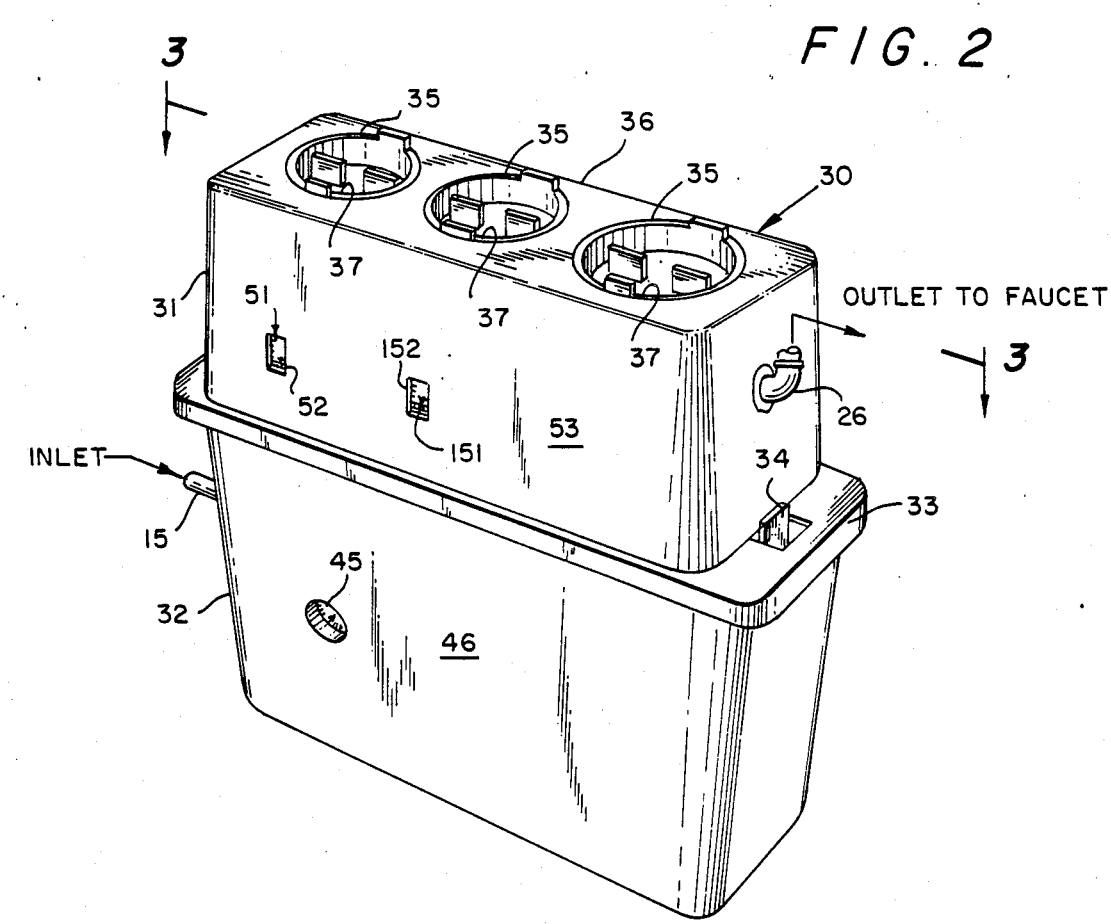
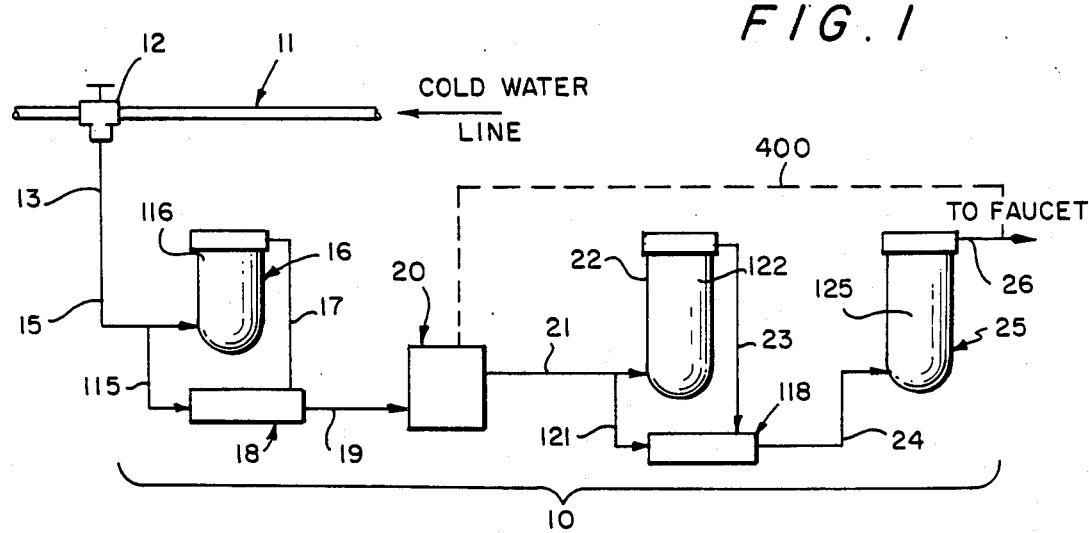

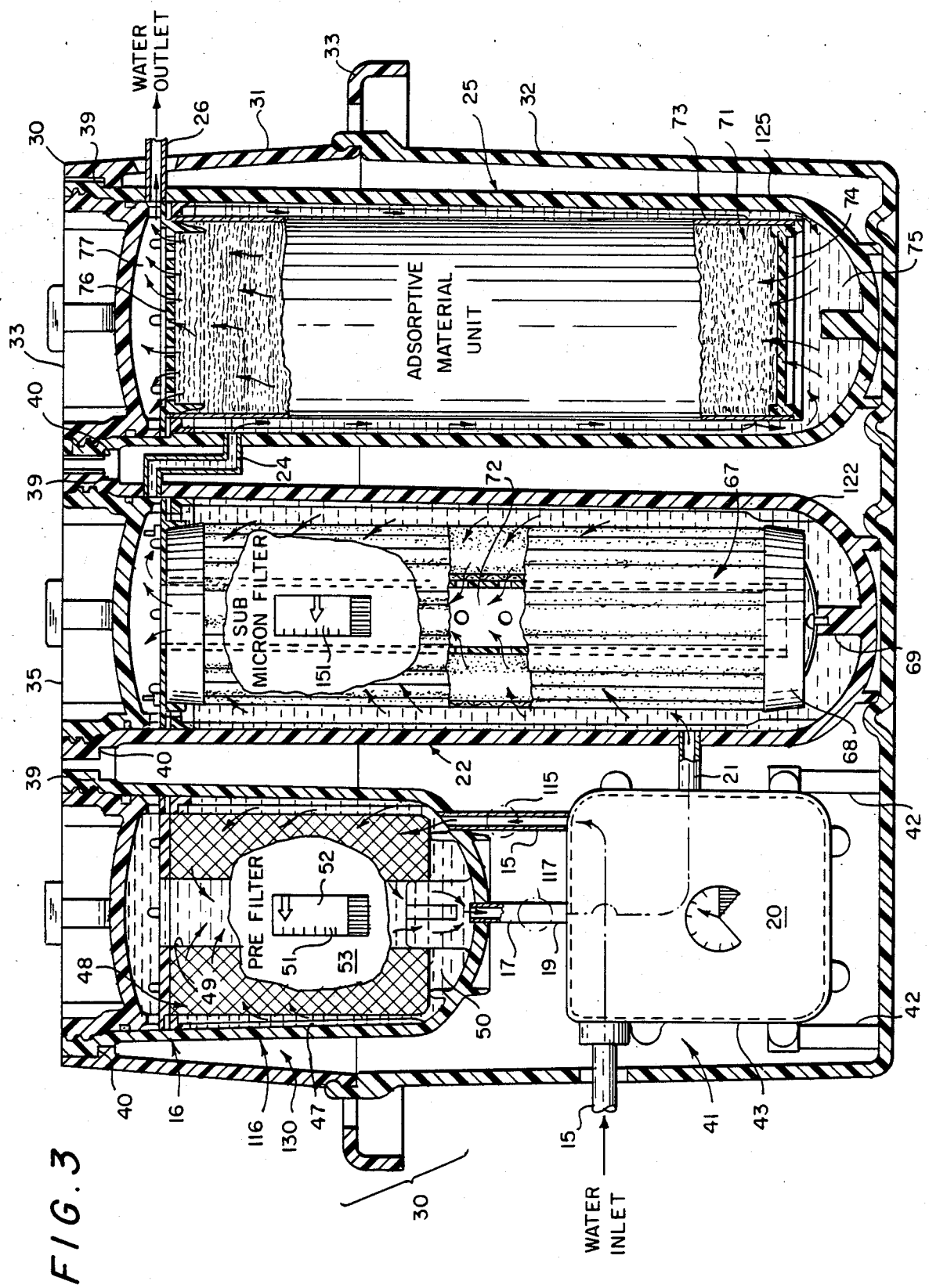

WATER PROCESSOR HAVING AUTOMATIC SHUTOFF AND BYPASS MEANS

This application is a continuation of Ser. No. 326,963 filed Dec. 2, 1981, now abandoned, which is a continuation of Ser. No. 167,169 filed July 8, 1980, now abandoned, which is a continuation-in-part of Ser. No. 039,936 filed May 17, 1979 now abandoned, which is a continuation-in-part of Ser. No. 879,027 filed Feb. 17, 1978, now abandoned.

BACKGROUND

Water processor devices for use in homes, restaurants and the like are known. See, for example, U.S. Pat. Nos. 3,836,458 of Sept. 17, 1974; 3,974,070 of Aug. 10, 1976; 4,025,705 of May 24, 1977; and 4,059,522 of Nov. 22, 1977. Such devices ordinarily include an adsorption element such as activated charcoal and one or more mechanical filters to remove suspended solids and/or a submicron filter to trap bacteria, cysts and spores. However, such known water processors can become a health hazard after a period of use, since the adsorption element may introduce contaminants under certain conditions. For example, potentially harmful contaminants, such as pesticides and haloforms, which are normally removed by the adsorption element, will end up being discharged from the unit when the adsorption element has become saturated. Similarly, mechanical filtration membranes may rupture, introducing additional contaminants at hazardous levels.

SUMMARY

Certain features of the present invention provide positive means of identifying the end of functional life for two types of water processor means, i.e., (1) mechanical filters and (2) adsorptive or ion exchange materials. Various combinations of those means are also encompassed within the scope of this invention.

Mechanical filters reach the end of functional life when they have become clogged enough to either seriously reduce the flow of water or to stop the flow. The amount of flow reduction that is permissible is a function of the basic design of the water treatment device or system, for example, in cases where the device has been designed to operate effectively only within a specific range of flow rates, or under conditions prone to develop excessive back pressures which may result in the rupture of filter membranes. In all cases, the interposition of a mechanical filter in a flowing stream causes a measurable pressure drop across the filter membrane. The measured water pressure on the inlet side of the filter is always higher than the measured water pressure on the outlet side of the filter. As the filter accumulates filtered material on its inlet face or surfaces, the available passages become blocked or otherwise occluded, and the pressure differential across the filter increases.

In accordance with one aspect of the present invention, improvements have been designed which measure pressure differentials, and when a filter is at or near depletion, the water processor incorporating a depleted filter is automatically shut off.

A further indication of the depletion of the filter may be achieved by adding external indicator means to said shutoff unit which will inform a person by any suitable visual or audible sound means of the condition of the filter associated therewith.

Adsorptive and ion exchange materials in such water treatment systems become exhausted, i.e., depleted by exhaustion (which may result from chemical reaction), since only specific amounts of materials, or combinations of materials, are capable of being adsorbed or exchanged. In the case of sorptive materials, there are no known relatively simple and economical indicators of exhaustion, those known being quite costly and requiring complex methods of effluent analysis. Exhaustion of ion exchange materials may be identified in some areas by color changes in pH sensitive dyes, or by taking advantage of the expansion characteristics of certain resins. However, neither of the two techniques is applicable to all resins, nor to all water conditions. The present invention provides a means of identifying imminent exhaustion of the sorptive or exchange capability of such materials by indicating a predetermined number of gallons which are known to be the maximum safe quantity. The water meter device for this purpose can be designed to function for a large number of gallons, with the ability to preset it for any lesser quantity of gallons, at which time the water processor is shut off until the absorptive or exchange materials are replaced.

In a preferred embodiment, such water meter device comprises a unitary mechanical turbine wheel arrangement which automatically measures the water flow and activates, when the maximum safe quantity has been reached, a shutoff valve which functions both to terminate water flow and to turn off the processor. Alternatively, a chemical or other form of water meter device can be utilized. For example, a material with a known capability for erosion or ablation is exposed to fluid flow so as to measure total amount of such flow. In the specific instance of measuring the quantity of water flowing past a point, the materials may be polyethylene oxide in the form of a solid rod or other configuration. For controlling a suitable valve to shut off the water flow, the rod may be spring biased, such that as the material thereof becomes eroded by continual flow, a valve member coupled to the rod is correspondingly biased to the closed position.

Since the sorptive or exchange material may be providing water to a device that could be damaged by interception in the flow of the water, an automatic bypass may be incorporated in the system, so that when the shutoff valve is activated, the influent waters automatically bypass the sorptive or exchange material and flow directly to the device's effluent means. Alternately, the readout device may be used to trip an electric or electronic switch to operate visible or audible signals either when the unit is in shutoff or bypass mode. This bypass device should be located somewhere in the influent means of the water treatment system concerned and preceding the influent to the sorptive or exchange materials.

In some installations the quantity of particulates in the water to be treated is so large that it may be desirable to use a prefilter in the initial portion of the influent section to avoid premature clogging in the second sorptive or carbon cartridge. In such case a pressure differential shutoff unit may be connected to the prefilter to advantage so that the user can identify when the prefilter should be changed. This system may provide both mechanical filtration and sorptive treatment. In another system it may be desirable to incorporate two filters and one sorptive material cartridge with each filter having its own pressure differential appreciable flow rate reducing or shutoff device, so that when clogging occurs, the user can identify which filter needs replacement. At the same time, a flow quantity shutoff device may be installed to control the number of gallons to be treated by the sorptive material. Accordingly, such flow control devices may be incorporated in any water treatment system that includes filter medium alone, or sorptive or exchange material alone, or any combination of the various versions of those treatment means.

A general object of the present invention is to provide easily installed and readily services equipment for water processing apparatus which renders such apparatus "fail safe".

DESCRIPTION OF THE DRAWINGS

Other objects of the invention will in part be obvious and will in part appear from reference to the following detailed description taken in connection with the accompanying drawings, wherein like numerals identify similar parts throughout, and in which:

FIG. 1 is a diagrammatic view of a water supply line to which a typical form of such a water processor system is connected and diagrammatically showing in block diagram fashion a layout of units thereof which may be desirable as they are successively connected together;

FIG. 2 is a perspective view of a housing in which, by way of example, a reduction to practice of the water treatment system of FIG. 1 is or may be housed;

FIG. 3 is an enlarged vertical section of a reduction to practice of this invention taken substantially on line 3—3 of FIG. 2, with internal parts of some of the housed units being broken away and sectioned;

Figure 4:
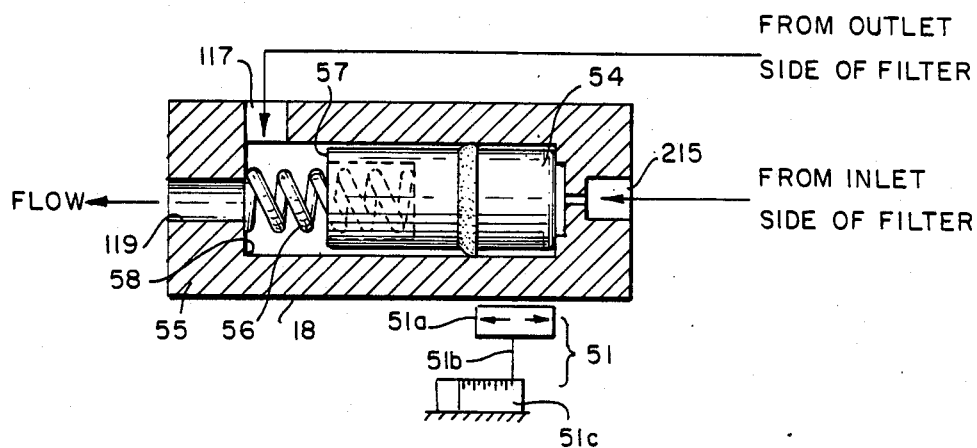
FIG. 4 is an enlarged longitudinal sectional view of a pressure drop indicator and flow interruptor unit shown in FIG. 1.

The water treating system that is illustrated diagrammatically at 10 in FIG. 1 is connected in any suitable manner to cold water supply pipe 11. A convenient self-tapping saddle type of inlet valve 12 may be installed on the water supply line 11, to supply the water to the treating system 10 through branch pipe 13 to inlet pipe or tube 15 of the treatment system. Water inlet pipe 15 is connected to the interior of the first treatment unit of the system, which is a particulate pre-filter unit 16. For convenience in certain systems installations, this supply pipe connection may be located at a point near the bottom of receptacle 116 of unit 16. Conveniently, the outlet of the pre-filter unit 16 may then be a delivery tube 17 connected to the interior of the casing of this receptacle 116 in the vicinity of the top thereof. As will be more readily understood later by reference to FIG. 4, the pressurized water inlet pipe 15 of the pre-filter unit 16 is suitably connected by a tube 115 to one end of a pressure drop indicator and flow interrupter 18 for interrupting the flow of water in the influent section when a predetermined differential in pressure between the inlet and outlet sides of the pre-filter unit 16 occurs.

The interrupter unit 18 may be of a type which is shunted across the inlet and outlet passages leading to and from the pre-filter, with the outlet including conduit or pipe 19 feeding water to a succeeding unit of the system of FIG. 1.

Preferably, feed pipe 19 supplies water from which quantities of suspended solids have been filtered out by the pre-filter unit 16 to a suitable water meter 20 which may be of a recording type and, if desired, have an automatic flow shutoff associated therewith, as will be more fully understood by reference later to FIG. 5. It is to be understood that the water meter 20 may, if desired, precede the particulate pre-filter unit 16, or the latter may be omitted from the water treating system when the quantity of suspended solids in the available water source is below that considered to be possibly troublesome. In any event, the metered water is delivered from the influent section or the meter unit 20 thereof by means of pipe 21 to a following effluent section.

The effluent section may embody a variety of types of water treating units, such as, for example, one or more submicron filters and/or one or more adsorptive material units. For example, and as is illustrated in FIG. 1, the effluent section may include a submicron filter unit, generally indicated by the numeral 22 in a second receptacle 122 to which the delivery pipe 21 is connected, and also may have connected thereto an outlet pipe 23. The inlet and outlet pipes 21 and 23 preferably have shunted thereacross by branch tube 121 and the outlet pipe 23 another pressure drop indicator and flow interruptor unit 118 for a purpose relative to submicron filter unit 22 similar to that served by the pressure drop-responsive unit 18 with respect to the prefilter unit 16. Pipe 24 is connected to the interrupter unit 118 as a delivery conduit that is connected to an inlet of an adsorptive material cartridge unit, indicated generally by the numeral 25, with the outlet of the latter connected to a delivery tube or pipe 26 leading to a faucet or other water use equipment.

There is illustrated in FIGS. 2 and 3 a water processor housing 30 in the form of a closed tank structure defining therein a chamber area which may house a series of units of a typical water processing system, such as that illustrated in FIG. 1 or the variant thereof proposed above. The water processor housing 30 includes a pair of deep cavity pans or tubs 31 and 32 clamped together by any suitable means. Such clamping means may embody a lateral rim 33 surrounding the open side of the top pan 31, and so apertured as to receive therethrough suitable fastening clips 34 carried by the bottom pan 32, as may be seen in FIGS. 2 and 3. Cavity pans 31 and 32 may be anchored together by a variety of types of suitable means which may include a lock requiring the use of special keys for opening up the processor housing 30. Specialized locking means may also be employed to prevent removal of caps 35 from the plurality of access holes.

As will be best understood from FIG. 3, each of the large access holes 37 is equipped with a depending skirt 38 provided with an internal annular shoulder 39 for support of an external annular shoulder 40 defined on the exterior of the mouth of a plurality of tubular and closed-bottom receptacles 116, 122 and 125. These receptacles have internally threaded openings for threaded engagement of the respective cap 35 with the latter closing off in fluid-tight or leak-proof manner the interior chambers of these receptacles 116, 122 and 125.

It will be noted from FIG. 3 below the prefilter receptacle 116 in space 41, a water meter unit 20 is supported by elevating means 42 provided within the tank chamber. The water meter unit 20 includes a watertight casing 43 on one wall of which is a dial and pointer counter 44 that may be viewed through a window 45 (FIG. 2) in a sidewall 46 of the bottom pan 32 so as to be readable from the exterior of the closed processor housing 30. An example of suitable meter mechanism which may be used to advantage in water meter casing 43 is hereinafter illustrated in FIG. 5 and described in connection therewith.

Pre-filter water supply tube 15 feeds water into the tubular receptacle 116 and annular space 47 to a porous pre-filter body 48. This water flows laterally through body 48 into open core 49 for collection in receptacle section 50 and then flows downward by way of tube 17 for ultimate flow through tube 19 within the housing chamber 130 to a pressure drop flow interruptor 18 (FIG. 4) with its indicator 51 (FIGS. 3, 4) associated therewith (the interruptor 18 is out of view in FIG. 3). This interrupter unit 18 is very important for terminating the flow of water when a predetermined, undesirably high differential in pressure between the inlet and outlet sides of the prefilter body 48 in receptacle 116 occurs. The indicator or dial 51 is exposed to view in a window 52 that is provided in sidewall 53 of housing member 31 (FIGS. 3 and 4).

As will be understood from FIGS. 3 and 4, the pressures of the water in inlet tube 15 and outlet tube 17 leading to and away from the prefilter body 48 in receptacle 116 are transmitted by tubes 115 and 117 (respectively connected to prefilter supply or inlet and discharge or outlet tubes 15 and 17) to opposite sides of a piston means 54 housed in a cylindrical casing 55 for axial movement therein. Tube 115, connected at inlet 215, applies the pressure of the inlet water in tube 15 to the one end of piston 54 to be opposed by the force of helical compression spring 56 applied to the other end of this piston. When the water pressure applied to the piston 54 becomes greater than the spring force applied to the other end, the piston moves forward (to the left in FIG. 4) so that the annular end 57 of its front skirt, acting as a valve, abuts an annular inner valve seat 58 circumscribed about outlet 119. This valve may be designed in various forms to either terminate flow, restrict, or intermittently interrupt the flow of water through the system when a predetermined pressure differential is exceeded. The visual indicator 51 will inform the user that porous prefilter body 48 requires replacement. A diaphragm type of pressure differential indicator may be used in substitution for the piston type illustrated, by way of example, in FIG. 4.

The visual indicator 51 may be conveniently operated by forming the piston 54 of paramagnetic material and the indicator manipulator 51a as a guided magnet to move with the piston longitudinally along the nonmagnetic casing 55 for translation of the pointer 51b relative to the fixed dial 51c.

Figure 5:
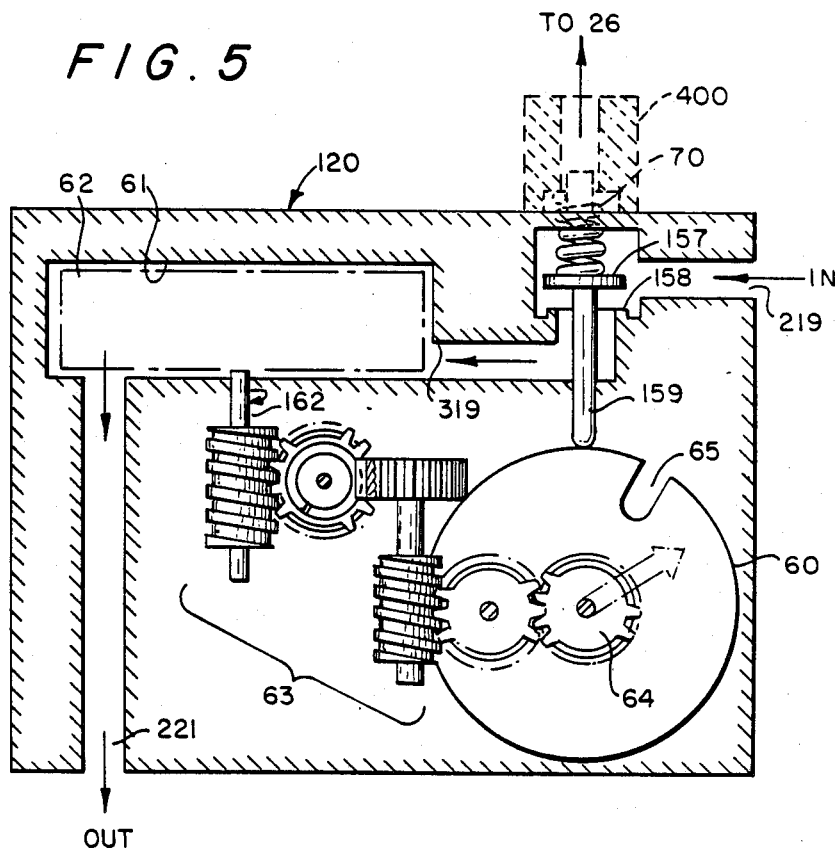
FIG. 5 is a longitudinal sectional view of a water meter unit shown in FIG. 1, with some parts indicated digrammatically while some details are omitted as being obvious, and illustrating this meter as being internally equipped for positive shutoff of water flow therethrough.

The water meter unit 20 which is housed in casing 43 (FIG. 3) has an internal mechanism assembly 120 (FIG. 5) suitably supported therein and, as will be seen from FIG. 5, this assembly includes an inlet passage 219 (which is connected to the water inlet pipe 19) and an outlet passage 221. This outlet passage is connected either to the inlet tube 15 of the prefilter 16 when the latter precedes the water meter 20 or to the inlet tube 21 of the submicron filter unit 22 when the water meter intervenes the prefilter unit 16 and the submicron filter unit 22, as is indicated in FIG. 1.

It will be noted from FIG. 5 that the mechanism 120 of the water meter embodies, in a through passage 319 between inlet 219 and outlet 221, a spring-biased shut-off valve 157 cooperative with a valve seat 158 of a duct section of the through passage. Valve 157 is held in open position relative to seat 158 by stem or pin 159 which rides on the circumference of a rotary cam 60 while this valve is "open". The flow passage 319 includes, for example, a turbine chamber 61 in which is rotatably supported a turbine wheel 62 that drives an output shaft 162 for imposing the desired rotary motion to a gear train 63 embodying suitable worm and spur gears which will effectively reduce the input motion from for example, one revolution per 0.03 gallons of through-flowing water to one revolution per 3,000 gallons. The output of the gear train 63 includes a driven spur gear 64 fixed to rotary cam 60 for rotation thereof. The periphery of the rotary cam 60 is interrupted by a notch 65 that will receive valve stem 159 due to movement by a helical compression spring 70 to close the valve 157-158 upon completion of rotation of cam disk 60. Closure of valve 157-158 terminates the flow of water through this meter flow passage as well as turning the processor 10 off. Such water meter may be associated with a read-out device 44 operated either by direct drive or a magnetic link, which may indicate what portion of a revolution has been made and also may indicate at what point the unit will shut off flow of water therethrough. A flow-restricting orifice designed to permit only minimal flow may be substituted for such a positive shut-off valve. Readout 44 will provide positive indication of exhaustion of the adsorbent material housed in the receptacle 125 of FIG. 3 and its need of replacement.

Submicron filter 67 is designed to trap bacteria, cysts and spores that are not trapped by the prefilter 48, as well as particulate matter between about $0.25\mu$ pore size and a few which may be relatively much larger (e.g., $3-5\mu$). Filter 67 of filter unit 22 is housed in tubular receptacle 122 supported by base means 68 and internal support 69. As will be seen from FIG. 1, if the water meter 20 follows the prefilter unit 16 (housed in receptacle 116), the outlet 17 from this prefilter unit via the pressure drop indicator and flow interruptor 18, and then tube 19, constitutes the inlet to the water meter 20 with the outlet thereof provided by tube 21 supplying the water from the meter into the tubular receptacle 122 which houses the submicron filter 67 (FIG. 3).

It is desirable that there may be associated with the housed submicron filter 67 another pressure drop indicator and flow interruptor 118 which may be similar to that indicated at 18 in FIGS. 1 and 4. This pressure drop indicator 151 serves to advise the user that filter 67 needs to be replaced.

It will be understood from FIG. 3 that while the submicron filter 67 is surrounded on the sides within the tubular receptacle 122 by pressurized water for flow through such body to the axial core passage 72 thereof for flow out of the top into the delivery tube 23, the final component of the system is adsorptive cartridge 25, which houses a mass of adsorbent material 71 supported by an impervious tubular casing 73 within tubular receptacle 125. The bottom end of casing tube 73 is fitted with transverse screen 74 through which the pressurized water 75 that flows down about the sides of this casing tube into the bottom of the tubular receptacle 125 will be forced upwardly through this mass for ultimate flow through a top filter 76, which may be a cloth layer or other filtering sheet to filter out fine particles of the activated carbon. This upward flowing water flows through the filter 76 into the head space 77 for delivery out through outlet or delivery tube or pipe 26.

Referring to FIGS. 1 and 5, the reference numeral 400 illustrates a safety feature or bypass arrangement when the water treatment/processor is supplying water to a coffee-maker or similar apparatus that could be damaged when the processor is shut down automatically and before the replacement of functional units is made, i.e., the submicron filter 67 or the adsorbent material 71. The bypass 400, as shown in FIG. 5, automatically passes raw water to the effluent pipe 26 of the processor when the valve 57 seats on 58 and valve 401 is unseated, thereby allowing raw or untreated water to bypass the processor.

It will be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described our invention, what we claim as new and desire to secure by Letters Patent is defined in the following claims.

1. A fail-safe water processor for in-line installation between a source of water supply and a point of use in a water distribution system, said fail-safe water processor comprising:

a housing having inlet means and outlet means adapted to be connected to a water distribution system so that water flowing through the water distribution system passes through said fail-safe water processor;

replaceable mechanical filter means and replaceable adsorption means within said housing in serial fluid communication with one another and with said inlet and outlet means said mechanical filter means causing a water pressure drop in water flowing through said water distribution means between said inlet means and said replaceable adsorption means across said mechanical filter means;

water metering means within said housing normally in fluid communication with said inlet means and with said replaceable adsorption means, said water metering means being actuated directly by water flowing through said fail-safe water processor regardless of the duration of flow so as to cumulatively total the quantity of water that has flowed through said water metering means to said replaceable adsorption means;

shutoff valve means operatively connected to said water metering means to stop water flowing to said replaceable adsorption means after a predetermined quantity of water has passed through said water metering means, said predetermined quantity of water being generally equal to the maximum safe quantity which can safely be treated by said replaceable adsorption means;

first indicator means associated with said water metering means for continuously indicating what portion of the functional life of said replaceable adsorption means has been exhausted and when said replaceable adsorption means is at the end of its functional life and should be replaced;

flow interruption means operatively associated with said replaceable mechanical filter means for measuring the pressure drop of water pressure across said replaceable mechanical filter means and for interrupting water flowing through said replaceable mechanical filter means when a predetermined water pressure differential, indicating the depletion of said replaceable mechanical filter means, exists across said replaceable mechanical filter means; and second indicator means associated with said replaceable mechanical filter means and said flow interruption means for indicating when the flow interruption means has interrupted the water flowing through said replaceable mechanical filter means and said replaceable mechanical filter means should be replaced.

2. The fail-safe water processor of claim 1, further including a water by-pass means connecting said shut-off valve means directly to said outlet means, said by-pass means being normally closed so that the water flow is through said replaceable adsorption means and being opened to permit the water flow to by-pass said replaceable adsorption means when said shut-off valve is closed to prevent the flow of water to said replaceable adsorption means.

3. The fail-safe water processor of claim 1, further including a mechanical pre-filter means in fluid communication with and mounted between said inlet means and said water metering means, and a second flow interruption means associated with said mechanical pre-filter means for interrupting water flowing through said mechanical pre-filter means when the water pressure drop across said mechanical pre-filter means reaches a predetermined value indicative of said mechanical pre-filter means becoming clogged.

4. The fail-safe water processor of claim 1, further including a plurality of receptacles within said housing, the replaceable mechanical filter means inserted within a first of said plurality of receptacles, and said replaceable adsorption means inserted within a second of said receptacles.

5. The fail-safe water processor of claim 4, further including the housing having upper and lower sections detachably secured to one another, said upper section having a plurality of openings, said plurality of receptacles being disposed respectively in said openings, and said openings permitting selective access to said receptacles through a plurality of caps serving as removable closures for said openings.

6. The fail-safe water processor of claim 5, further including a third receptacle mounted within another of said openings and having a cap serving as a removable closure permitting selective access thereto, a mechanical pre-filter means removably mounted within said third receptacle in said housing and between said inlet means and said water metering means, the mechanical pre-filter means progressing with use from an unclogged condition to a clogged condition, means associated with said mechanical pre-filter means for interrupting water flowing therethrough when said mechanical pre-filter means becomes clogged, and indicator means for indicating the condition of said mechanical pre-filter means as the mechanical pre-filter means progresses from an unclogged condition to a clogged condition.

7. The fail-safe water processor of claim 1, in which said flow interruption means further comprises a water pressure differential device connected in shunt with respect to said replaceable mechanical filter means for measuring water pressure drop across said replaceable mechanical filter means.

8. The fail-safe water processor of claim 7, in which said housing has an individual window to permit said second indicator means associated with said flow interruption means and said replaceable mechanical filter means to be viewed.

9. The fail-safe water processor of claim 7, in which said water pressure differential device includes a piston axially movable in a casing, and a pair of tubes connected respectively to opposite ends of said piston, for measuring said water pressure drop.

10. The fail-safe water processor of claim 9, in which said water pressure differential device has an inner valve seat and said piston has an annular end serving as a valve and operable to abut said inner valve seat.

11. The fail-safe water processor of claim 9, further comprising said second indicator means associated with said flow interruption means and said replaceable mechanical filter means being a visual indicator operable as a guided magnet to move with said piston.

12. The fail-safe water processor of claim 1, in which said first indicator means associated with said water metering means includes a dial and pointer.

13. The fail-safe water processor of claim 1, in which said shutoff valve means includes a spring-biased valve, a rotary cam having a notch, and a pin operative to ride on the circumference of said rotary cam to keep said valve open, and to be received by said notch to close said valve.

14. A fail-safe water processor for in-line installation between a source of water supply and a point-of-use in a water distribution system, said fail-safe water processor comprising:

a housing having upper and lower sections detachably secured to one another and having a plurality of openings in said upper section, at least first and second receptacles disposed in said openings so as to extend into said housing, each of said receptacles having a removable closure permitting selective access thereto;

said housing further having inlet and outlet means connected to the water distribution system so that water flowing through the distribution system passes through said housing;

fluid conduit means connecting said receptacles in serial fluid communication with one another and with said inlet and outlet means;

a mechanical filter means replaceably disposed within the first of said at least first and second receptacles, said mechanical filter means causing a pressure drop in water flowing through said water distribution means between said inlet means and said second receptacle across said mechanical filter means when said mechanical filter means clogs to reduce the water flowing therethrough;

flow interruption means operatively associated with said mechanical filter means and responsive to the water pressure drop across said mechanical filter means to interrupt water flowing through said fail-safe water processor when a predetermined water pressure drop, indicating depletion of said mechanical filter means, exists across said mechanical filter means;

adsorption filter means replaceably disposed within the second of said at least first and second receptacles;

water metering means within said housing in fluid communication with said inlet means and with said adsorption filter means, said water metering means being actuated directly by water flowing through said fail-safe water processor to cumulatively total the quantity of water that has flowed through said water metering means to said adsorption filter means;

shutoff valve means operatively connected to said water metering means to close the flow of water to said adsorption filter means after a predetermined quantity of water has passed through said water metering means, said predetermined quantity of water being generally equal to the maximum safe quantity that can safely be treated by said adsorption filter means;

first indicator means operatively associated with said water metering means and said adsorption filter means for continuously indicating what portion of the adsorption filter means has been exhausted and when said adsorption filter means should be replaced; and second indicator means operatively associated with said flow interruption means and said mechanical filter means and observable through said housing to indicate the depletion of said mechanical filter means.

15. The fail-safe water processor of claim 14, further including a third receptacle mounted within another of said openings and having a removable closure permitting selective access thereto, a mechanical pre-filter means replaceably disposed within said third receptacle in said housing and between said inlet means and said water metering means, the mechanical pre-filter means progressing with use from an unclogged condition to a clogged condition, means associated with said mechanical pre-filter means for interrupting water flowing therethrough when said mechanical pre-filter means becomes clogged and third indicator means for indicating the condition of said mechanical pre-filter means.

16. The fail-safe water processor of claim 14, further including:

bypass means connecting said shutoff valve means directly to said outlet means, said bypass means being normally closed when said shutoff valve means permits water to flow to said adsorption filter means and being opened to permit water to flow to said outlet means bypassing at least said adsorption filter means when said shutoff valve means stops the water flowing to said adsorption filter means.

* * * * *